No. 892,744. PATENTED JULY 7, 1908.
F. E. LANDBERG.
TRANSMISSION GEAR.
APPLICATION FILED AUG. 27, 1906.

2 SHEETS—SHEET 1.

Witnesses
F. J. Veihmeyer
V. E. Burner

Inventor
Fredrick Ernest Landberg
by Elson Bro's,
Attorneys

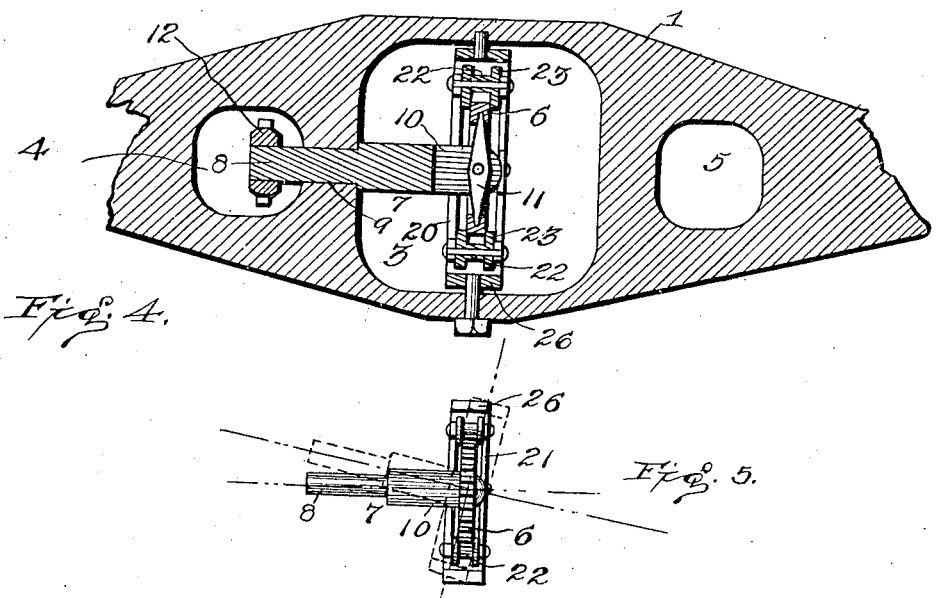

UNITED STATES PATENT OFFICE.

FREDRICK ERNEST LANDBERG, OF McCOOK, NEBRASKA.

TRANSMISSION-GEAR.

No. 892,744.

Specification of Letters Patent.

Patented July 7, 1908.

Application filed August 27, 1906. Serial No. 332,257.

*To all whom it may concern:*

Be it known that I, FREDRICK ERNEST LANDBERG, a citizen of the United States, residing at McCook, in the county of Red Willow and State of Nebraska, have invented certain new and useful Improvements in Transmission - Gears; and I do hereby declare the following to be a full, clear, and exact description of the invention, such as will enable others skilled in the art to which it appertains to make and use the same.

My invention relates to new and useful improvements in transmission gearing for motor-vehicles; and it has for its object to provide a novel construction and form of gearing by means of which the power is applied on the front axle of a motor-vehicle.

This invention consists in certain novel features of construction, and combinations of parts as will be hereinafter described, and pointed out in the claims.

Figure 1:
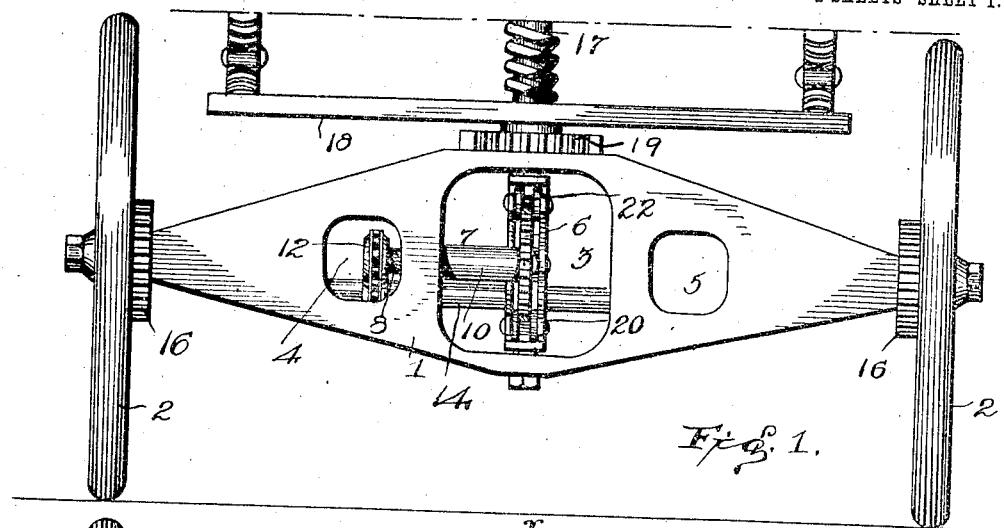
Figure 2:
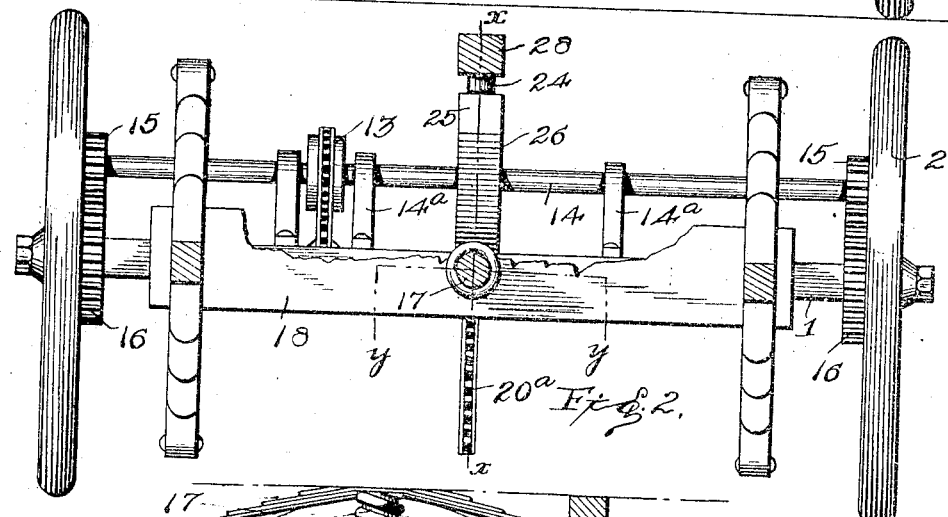
Figure 3:
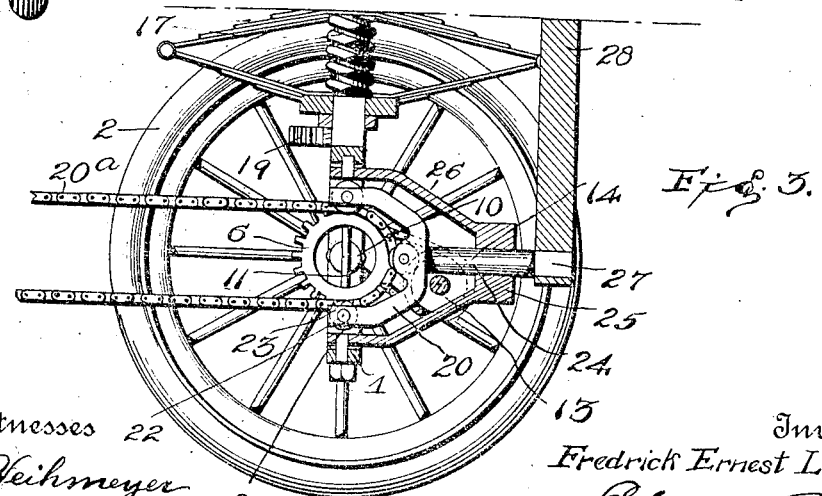

In the accompanying drawings forming a part of this application, Figure 1 is an elevation of the front axle and wheels of a vehicle embodying my invention. Fig. 2 is a broken plan view thereof. Fig. 3 is a sectional view taken on line $x$—$x$ of Fig. 2. Fig. 4 is an enlarged broken sectional view taken on line $y$—$y$ of Fig. 2. Fig. 5 is a broken detailed view of the driving sprocket wheel, a second position of the auxiliary shaft and the consequent positions of the other parts being indicated in dotted lines, to show the universal movement of the wheel.

In the construction shown in the figures, the reference character 1 indicates a frame which corresponds to the front axle of a motor-vehicle, the said frame being provided with wheels 2 loosely mounted thereon. A large central opening 3 and two smaller side openings 4 and 5 are arranged in the said frame as illustrated in Fig. 1. The main driving sprocket wheel 6 is hung in the central opening 3 on the auxiliary shaft 7, said shaft having a portion 8 extending through a bearing 9 which connects the opening 3 with the opening 4. The shaft 7 has an enlarged end portion 10 which abuts against the side face of the opening 3 to limit the inward movement of the sprocket as illustrated in Fig. 4. The enlarged portion 10 is bifurcated to receive the spoke 11, the said spoke being pivoted in the said bifurcated portion and also in the rim of the sprocket wheel. By this arrangement of pivots the rim has universal movement with respect to the shaft. In the opening 4 and on the end of the portion 8 of the shaft 7 is mounted a sprocket wheel 12, having a chain connection with a compensating gear 13 arranged on a driving shaft 14 which is supported in brackets 14ª secured to the face of the frame. Mounted on the extremities of said shaft are two small pinions 15 meshing with large gear wheels 16 which are rigidly connected to the wheels 2. Chain connection 20ª is made between a suitable source of power and the main sprocket 6 whereby power is transmitted through shaft 7, sprocket 12, compensating gear 13, pinions 15 and gears 16 to the wheels 2 of the vehicle. The frame 1 carries a king-bolt 17 which extends through a bearing in a cross bar or spring-support 18 and is suitably secured to the body of the vehicle in any well-known manner. The said king-bolt may also be provided with a pinion 19 by means of which the frame may be given a horizontal rotary motion for steering purposes.

Although not essential to the operation of my device, as anything that will hold the main sprocket wheel 6 in line with the engine will suffice, I prefer to use the form of guide shown. The said guide comprises a U-shaped frame 20 having arms 21 extending around the semi-circumference of the sprocket 6. Mounted on suitable bearings in the said frame are three rollers 22, positioned as illustrated in Fig. 3. The said rollers have flanges 23 adapted to bear against the side faces of the rim of the sprocket wheel and thus reduce the friction that would otherwise result if the guide had stationary pieces bearing against the rim. The frame 20 has an extending cylindrical portion 24, which is supported in a bearing arranged in a portion 25 of a supporting frame 26. The said frame 26 preferably is of a shape corresponding to that of the frame 20 and is pivotally supported in the opening 3. The cylindrical portion 24 of the frame 20 has a squared end 27 which is adapted to be inserted into any convenient support which is in alinement with the engine, such as the brace or support 28 which is secured to the body of the vehicle. The sprocket is thereby always held in alinement with the engine no matter what position the frame and wheels may take.

I claim:

1. The combination, with an intermediately pivoted transverse axle and wheels loosely mounted on the ends thereof, of gears rigidly secured to said wheels, a shaft mounted on said axle, gears carried by said shaft and adapted to mesh with the gears on said wheels, an auxiliary shaft on said axle, means to drive said auxiliary shaft including a sprocket mounted thereon and having universal movement with relation thereto, and means of connection between said main and auxiliary shafts.

2. The combination, with a pivoted axle, and wheels, of a shaft arranged on said axle and having one end bifurcated, a sprocket wheel having a spoke pivoted in the rim thereof and also in the bifurcated portion of said shaft, and means to drive said wheels through the medium of said sprocket wheel and shaft.

3. The combination, with a pivoted axle, and wheels, of a shaft arranged on said axle and carrying a sprocket having universal movement with relation to said shaft, means to always hold said sprocket in line with the source of power, and means to drive said wheels through the medium of said sprocket and shaft.

4. The combination, with a pivoted axle, and wheels, of a shaft arranged on said axle and carrying a sprocket having universal movement with relation to said shaft, a guide engaging both sides of said sprocket and holding the latter always in line with the source of power, and means to drive said wheels through the medium of said sprocket and shaft.

5. The combination, with a pivoted axle, and wheels, of a shaft arranged on said axle and carrying a sprocket having universal movement with relation to said shaft, a guide having flanged rollers engaging said sprocket and holding it always in line with the source of power and means to drive said wheels through the medium of said sprocket and shaft.

6. The combination, with a pivoted axle, and wheels, of a shaft arranged on said axle and having one end bifurcated, a sprocket wheel having a spoke pivoted in the rim thereof and also in the bifurcated portion of said shaft, a guide engaging both sides of said sprocket and holding the latter always in line with the source of power, and means to drive said wheels through the medium of said sprocket and shaft.

7. The combination, with a pivoted axle, and wheels, of a shaft arranged on said axle and having one end bifurcated, a sprocket wheel having a spoke pivoted in the rim thereof and also in the bifurcated portion of said shaft, a guide having flanged rollers engaging said sprocket and holding it always in line with the source of power, and means to drive said wheels through the medium of said sprocket and shaft.

8. The combination, with a pivoted axle, and wheels, of a shaft arranged on said axle and carrying a sprocket having universal movement with relation to said shaft, a guide engaging both sides of said sprocket and holding the latter always in line with the source of power, a supporting frame, for said guide, pivoted on said axle and permitting of free movement of the guide therein, and means to drive said wheels through the medium of said sprocket and shaft.

9. The combination, with a pivoted axle and wheels loosely mounted thereon, of gears rigidly secured to said wheels, a shaft mounted on said axle, gears carried by said shaft and adapted to mesh with the gears on said wheels, an auxiliary shaft arranged on said axle and having one end bifurcated, a sprocket having a spoke pivoted in the rim thereof and also in the bifurcated portion of said shaft, a guide engaging both sides of said sprocket and holding the latter always in line with the source of power, means to drive said sprocket and auxiliary shaft, and means of connection between said main and auxiliary shafts.

10. The combination, with a pivoted axle, and wheels loosely mounted thereon, of gears rigidly secured to said wheels, a shaft mounted on said axle, gears carried by said shaft and adapted to mesh with the gears on said wheels, an auxiliary shaft arranged on said axle and having an enlarged end portion engaging the bearing for said shaft, a sprocket mounted on said end of said auxiliary shaft and having universal movement with relation to said shaft, means to hold said sprocket always in line with the source of power, another sprocket mounted on the other end of said auxiliary shaft, a compensating gear on the main shaft, and means of connection between said second sprocket and said compensating gear.

In testimony whereof, I affix my signature, in presence of two witnesses.

FREDRICK ERNEST LANDBERG.

Witnesses:
 C. F. LEHN,
 MARY LEHN.